US008311794B2

(12) United States Patent
Saterdag et al.

(10) Patent No.: US 8,311,794 B2
(45) Date of Patent: Nov. 13, 2012

(54) TESTING EXECUTABLE LOGIC

(75) Inventors: Henrik Saterdag, Bad Schonborn (DE); Renzo Colle, Stutensee (DE); Daniel Zoch, Walldorf (DE)

(73) Assignee: SAP AG, Walldorf (DE)

( * ) Notice: Subject to any disclaimer, the term of this patent is extended or adjusted under 35 U.S.C. 154(b) by 1593 days.

(21) Appl. No.: 11/744,587

(22) Filed: May 4, 2007

(65) Prior Publication Data

US 2008/0276225 A1 Nov. 6, 2008

(51) Int. Cl.
G06F 17/50 (2006.01)

(52) U.S. Cl. .......................................... 703/15; 714/724

(58) Field of Classification Search .......... 703/6, 13–15; 717/124; 714/724, 741
See application file for complete search history.

(56) References Cited

U.S. PATENT DOCUMENTS

| | | | |
|---|---|---|---|
| 5,615,333 A | 3/1997 | Juettner et al. | |
| 5,751,941 A | 5/1998 | Hinds et al. | |
| 5,794,043 A | 8/1998 | Kolb | |
| 5,892,949 A | 4/1999 | Noble | |
| 6,353,897 B1 | 3/2002 | Nock et al. | |
| 6,505,342 B1 | 1/2003 | Hartmann et al. | |
| 6,523,169 B1 | 2/2003 | Glunz | |
| 6,601,018 B1 | 7/2003 | Logan | |
| 6,889,158 B2 | 5/2005 | Penov et al. | |
| 6,895,578 B1 | 5/2005 | Kolawa et al. | |
| 6,907,546 B1 | 6/2005 | Haswell et al. | |
| 6,963,815 B2 | 11/2005 | Watanabe et al. | |
| 7,080,284 B1 | 7/2006 | Zeevi et al. | |
| 7,865,900 B2 * | 1/2011 | Aakolk et al. | 719/310 |
| 2002/0032538 A1 | 3/2002 | Lee | |
| 2003/0208542 A1 | 11/2003 | Deming et al. | |
| 2004/0143819 A1 | 7/2004 | Cheng et al. | |
| 2004/0153830 A1 | 8/2004 | Cebula et al. | |
| 2004/0158788 A1 * | 8/2004 | Kaszynski et al. | 714/741 |
| 2005/0081106 A1 | 4/2005 | Chang et al. | |
| 2005/0132333 A1 | 6/2005 | Neumann et al. | |
| 2007/0006153 A1 | 1/2007 | Sultan | |
| 2007/0022407 A1 | 1/2007 | Givoni et al. | |
| 2007/0033442 A1 | 2/2007 | Tillmann et al. | |
| 2007/0061625 A1 | 3/2007 | Acosta, Jr. et al. | |
| 2008/0167853 A1 * | 7/2008 | Fernsler et al. | 703/14 |
| 2008/0189679 A1 * | 8/2008 | Rodriguez et al. | 717/105 |

OTHER PUBLICATIONS

"Test flexibly with AspectJ and Mock Objects" [online] IBM developerWorks 2002, [retrieved on May 17, 2007]. Retrieved from the Internet: <URL: http://web.archive.org/web/20021213100038/www-106.ibm.com/developerworks/java/libr...>.

"EasyMoek" [online]. EasyMock, 2001, [retrieved on May 17, 2007]. Retrieved from the Internet: <URL: http://web.archive.org/web/20010826015605/http://www.easymock.org/>.

* cited by examiner

Primary Examiner — Kamini S Shah
Assistant Examiner — Herng-Der Day
(74) Attorney, Agent, or Firm — Fish & Richardson P.C.

(57) ABSTRACT

A computer-implemented method for performing testing on executable logic includes providing, in a test framework, an instance of at least one object that is associated with an object-processing framework. The test framework has at least one interface that is common with the object-processing framework. The method includes calling a logic portion that is to be tested, the logic portion being called with at least one test parameter received from a user. The method includes recording a result of an operation that is performed as the logic portion causes the at least one object in the test framework to be accessed using the at least one interface. Also a related computer program product and graphical user interface.

15 Claims, 5 Drawing Sheets

TESTING EXECUTABLE LOGIC

TECHNICAL FIELD

This document relates to testing.

BACKGROUND

Computer systems are configured to include a collection of modules, components or other entities that take part in the operation of the system and that can affect its behavior in one or more ways. Such units can be considered the modules that make up the system and they are often implemented as software components. Software can be written in any of a number of programming languages and is generally used to cause a processor to execute specific instructions. However, after designing such a system it may be desirable to test one or more aspects thereof to verify whether it works, or will work, as intended.

Testing can include verifying some or all aspects of the system's operation, for example to verify that a result is obtained. For example, testing can be performed at a relatively low level to determine that basic units are able to communication with each other, without indicating whether the communication is correct, meaningful or complete. As another example, testing may be performed at a relatively high level to ascertain whether the quality of the communication is as intended or at least acceptable. In either of these examples, the outcome of a test can be used in modifying the existing system or in designing another, improved, system.

While specific kinds of testing were mentioned in the above examples, it is understood that a number of types of testing exist and can be performed for any of multiple purposes.

SUMMARY

The invention relates to testing executable logic.

In a first aspect, a computer-implemented method for performing testing on executable logic includes providing, in a test framework, an instance of at least one object that is associated with an object-processing framework. The test framework has at least one interface that is common with the object-processing framework. The method includes calling a logic portion that is to be tested, the logic portion being called with at least one test parameter received from a user. The method includes recording a result of an operation that is performed as the logic portion causes the at least one object in the test framework to be accessed using the at least one interface.

Implementations can include any, all or none of the following features. The method can further include implementing the test framework, before calling the logic portion, in a computer system where the testing is to be performed. The test framework can be configured to simulate an environment for the logic portion as if the logic portion had been called by the object-processing framework. The logic portion can be configured to call another logic portion in response to being called, and the method can further include preventing the other logic portion from being called during the testing. The method can further include simulating a call to the other logic portion during the testing. The test framework can have at least a READ interface and a MODIFY interface that are common with the object-processing framework, and the access of the object can be made using at least one of the interfaces. The method can further include: obtaining the test parameter and a return parameter from the user before calling the logic portion, the return parameter being an expected outcome of the testing; and outputting an outcome of the testing to the user, the outcome determined by comparing the result of the operation with the return parameter. The test parameter and the return parameter can be obtained under guidance of a user interface, and the user interface can provide for initiation of the testing without the user specifying how to determine the outcome. The method can further include modifying, using custom coding, at least one of the instance and the test parameter before calling the logic portion.

In a second aspect, a computer program product is tangibly embodied in a computer-readable medium and includes instructions that when executed by a processor perform a method for performing testing on executable logic. The method includes providing, in a test framework, an instance of at least one object that is associated with an object-processing framework. The test framework has at least one interface that is common with the object-processing framework. The method includes calling a logic portion that is to be tested, the logic portion being called with at least one test parameter received from a user. The method includes recording a result of an operation that is performed as the logic portion causes the at least one object in the test framework to be accessed using the at least one interface.

Implementations can include any, all or none of the following features. The method can further include implementing the test framework, before calling the logic portion, in a computer system where the testing is to be performed. The logic portion can be configured to call another logic portion in response to being called, and the method can further include preventing the other logic portion from being called during the testing. The method can further include simulating a call to the other logic portion during the testing. The method can further include obtaining the test parameter and a return parameter from the user before calling the logic portion, the return parameter being an expected outcome of the testing; and outputting an outcome of the testing to the user, the outcome determined by comparing the result of the operation with the return parameter. The method can further include modifying, using custom coding, at least one of the instance and the test parameter before calling the logic portion.

In a third aspect, a computer program product is tangibly embodied in a computer-readable medium and includes instructions that, when executed, generate on a display device a graphical user interface for initiating testing on executable logic. The graphical user interface includes a first input control for entering at least one test parameter to be used in calling a logic portion that is to be tested. graphical user interface includes a second input control for entering a return parameter that is an expected outcome of the testing. The graphical user interface includes a third input control for initiating the testing to include at least (i) calling the logic portion with the at least one test parameter; and (ii) recording a result of an operation that is performed as the logic portion causes at least one instance of an object in a test framework to be accessed using at least one interface, the at least one object being associated with an object-processing framework and the test framework having at least one interface that is common with the object-processing framework.

Implementations can include any, all or none of the following features. The graphical user interface can further include an output area for outputting an outcome of the testing determined by comparing (i) the return parameter with (ii) a result of an operation that is performed as the logic portion causes the at least one object in the test framework to be accessed using the at least one interface. The test parameter and the return parameter can be obtained under guidance of the graphical user interface, and the user interface can provide for initiation of the testing without the user specifying how to determine the outcome. The graphical user interface can further provide for modifying, using custom coding, at least one of the instance and the test parameter before calling the logic portion.

Implementations can provide any, all or none of the following advantages: providing improved testing of executable logic; providing a simplified user interface for setting up and operating a test framework; providing that realistic testing can be performed without negatively affecting, or receiving unwanted influence from, a system or framework being subject to the testing; and providing guidance for test implementers and making test implementations more understandable by structuring every test in the same or similar way.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
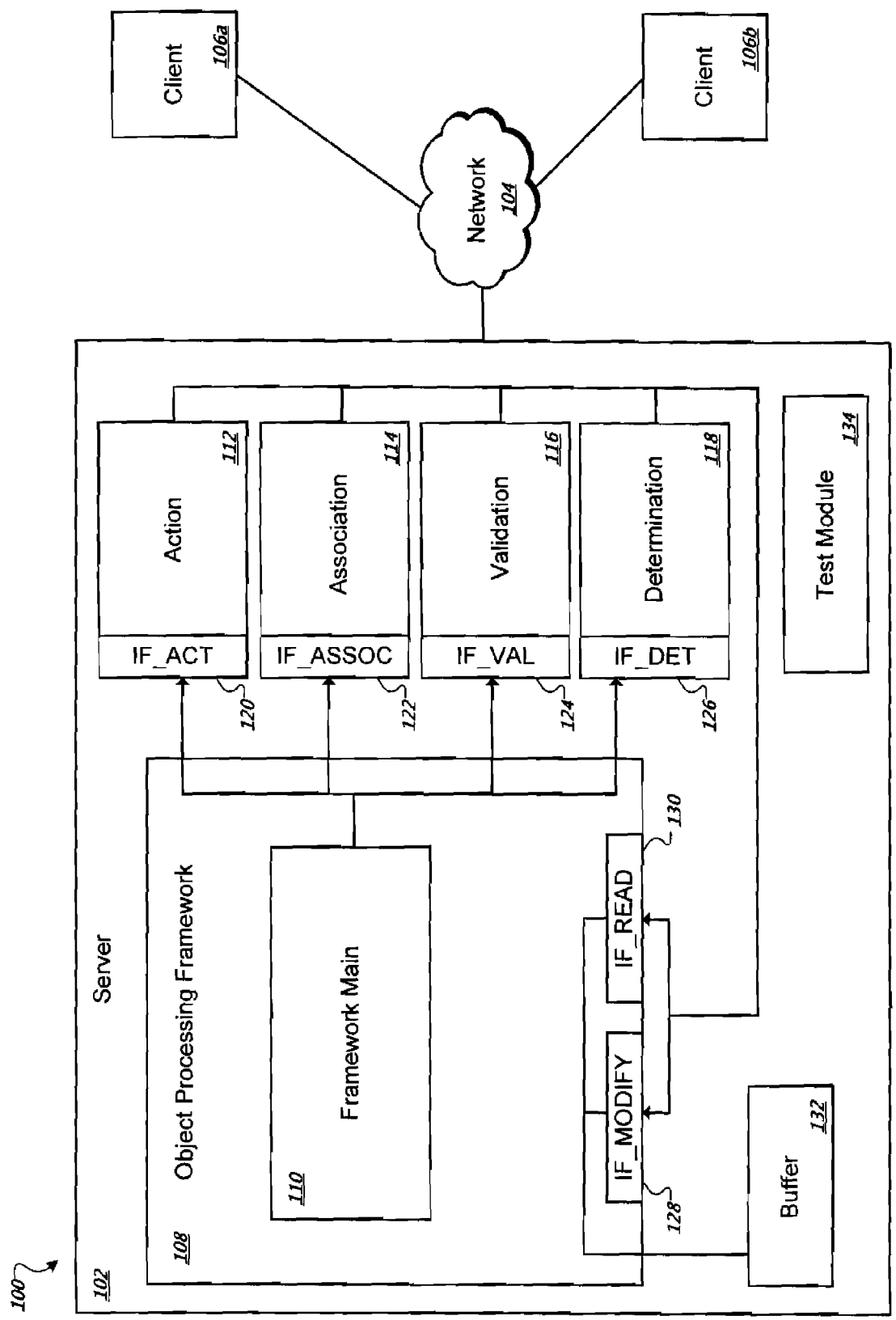
FIG. 1 is a block diagram of a computing system.

FIG. 1 is a block diagram of a computing system 100. The system 100 includes a server 102, which is connected to a network 104. The network 104 can be the Internet, a local area network (LAN), a wide area network (WAN) or some other type of network, to name a few examples. One or more client computer devices 106a and 106b can communicate with the server 102 across the network 104. For example, the client computing device 106a can send a request message across the network 104 to the server 102, requesting that the server 102 perform a service that a user of the client computing device 106a is interested in. The server 102 can perform the requested service and for example send a response message across the network 104 to the client computing device 106a. In the description below, it will be discussed how testing can be performed, for example in designing, evaluating or enhancing one or more aspects of the system 100. Other system architectures can be used in other implementations, including some that do not have a client-server configuration.

The server 102 can implement offered services using one or more objects. An object can represent an entity, service or other concept in a particular business context. For example, an object can represent a sales order, a product, or an advertising campaign. In implementations using an object-oriented programming (OOP) approach, objects can be grouped into categories, which are referred to as classes, based on the concept they represent. For example, all sales order objects can be grouped into a sales order class, and all advertising campaign objects can be grouped into an advertising campaign class. As another example, a sales order class can define "place order", "change order", and "cancel order" methods that can be used with sales order instances. In some implementations, non-OOP objects can be used.

The server 102 includes an object-processing framework 108. The object-processing framework 108 can be a collection of collaborating code and objects which provide a structure for developing and/or running applications. The object-processing framework 108 here includes common processing functionality that is usable by one or more applications. To name a few examples, a developer can use existing code in the object-processing framework 108 to accomplish common tasks and the developer can create new objects that are specific to the application being constructed to perform functionality that is not offered in the object-processing framework 108.

The object-processing framework 108 includes a framework main component 110. The framework main component 110 can be a starting execution point for the object-processing framework 108. The framework main component 110 here includes code that is executed to accomplish one or more tasks in the object-processing framework 108, such as to trigger a service to be performed. In these and other situations, the framework main component 110 can initiate the execution of code that is included in other objects and modules.

Business logic can be grouped into categories based on the type of interaction a particular logic portion has with an object. Some examples of logic portions will now be described. A logic portion 112 is a logic portion type configured to involve one or more actions. An action can be changing an attribute value of an object, such as changing the quantity of an item ordered on a sales order object. Accordingly, the portion 112 can be called or invoked to have that action performed.

A logic portion type 114 includes business logic that is involved with associations. An association relates one entity to one or more other entities. For example, a sales order object can be associated with a particular customer object. The portion 114 can be used in establishing, maintaining or modifying that association, to name a few examples.

Logic portion types 116 and 118 include business logic related to validations and determinations, respectively. Validations and determinations can involve assessing whether an object or other information is in a particular state, such as a valid state. For example, a validation can be performed to test if all items ordered on a sales order have a quantity-ordered value that is greater than zero. As another example, a determination can involve determining one or more aspects of a current system state.

Interfaces can be defined to provide access to action, association, validation, determination and other logic portion types. An action interface 120 can include definitions of interfaces which can be used to access logic portions involving action. For example, a "PREPARE" interface can be used to prepare for an action, and an "EXECUTE" interface can be used to execute, or perform the action.

An association interface 122 can include definitions of interfaces which can be used to access logic portions involving associations. For example, a "CREATE" interface can be used to create an association. A "RESOLVE" interface can be used to resolve an association. For example, a "RESOLVE" interface can be used to determine which customer placed a particular sales order.

A validation interface 124 and a determination interface 126 can include definitions of interfaces which can be used to access logic portions involving validations or determinations.

For example, an "EXECUTE" interface can be used to execute a particular validation and/or determination.

Interfaces 120, 122, 124 and 126 can be called by the object-processing framework 108. For example, the framework main 110 can call an interface defined in the association interface 122. The logic portions 112, 114, 116, and 118 can be located outside of the object-processing framework 108, inside the object-processing framework 108, or can be implemented on another device such as the client computing device 106a, to name a few examples.

Some or all of the logic portions 112, 114, 116, and 118 can access objects in the object-processing framework 108. The object-processing framework 108 can be configured so that all outside access to objects inside the object-processing framework 108 is done through a common set of one or more interfaces. For example, an IF_MODIFY interface 128 can be defined which allows for modification of objects using the object-processing framework 108. An IF_READ interface 130 can be defined which allows for read access to objects using the object-processing framework 108.

Either or both of the IF_MODIFY and IF_READ interfaces 128 and 130 can access the data of an object in a buffer 132. The buffer 132 can include a copy of data from one or more objects. For example, the buffer 132 can hold object data that has been retrieved from a database or other repository. The data in the buffer 132 can be synchronized with the data in the database, and can be used as a holding location for processing data without accessing the database/repository.

The IF_MODIFY and iF_READ interfaces 128 and 130 can return a value which indicates a result of the operation that has been performed. For example, the IF_READ interface 130 can return the actual value read from the buffer, and the iF_MODIFY interface can return a true or false value indicating whether the requested modification was successful. As another example, the IF_MODIFY interface can return a value which is equal to what an attribute value of an object was changed to. Other interfaces and/or other functionality in the interfaces can be used.

The server 102 here includes a test module 134. The test module 134 can be used for testing logic found in the object-processing framework 108 and the logic portions 112, 114, 116, and 118. For example, the test module can be used for creating a test environment where the function of one or more portions of logic can be tested. In so doing, the test module 134 can be invoked in the system 100 as shown in this example, or it can be used in a separate system.

Figure 2:
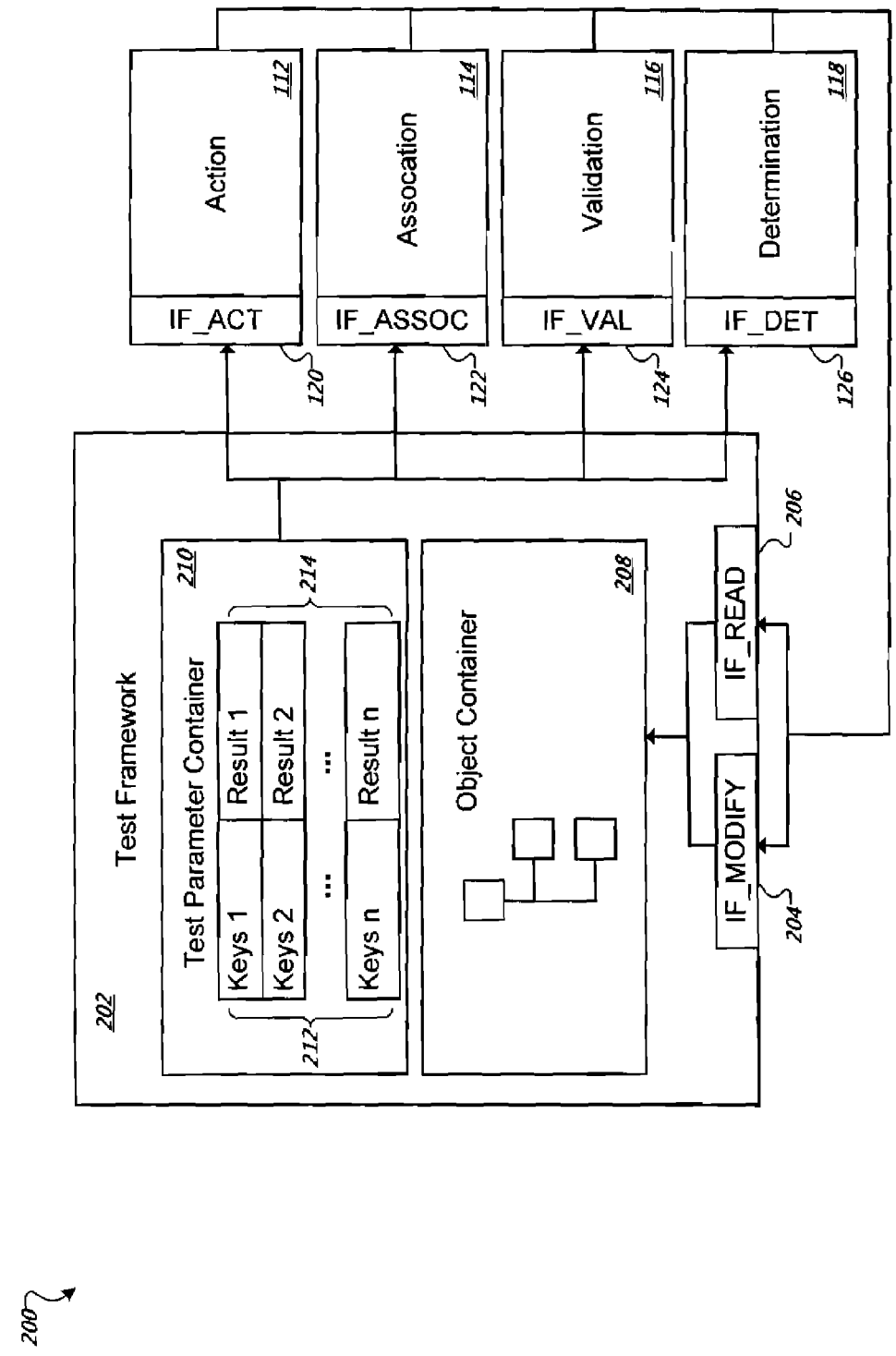
FIG. 2 is a block diagram of a test system.

FIG. 2 is a block diagram of a test system 200 that can be implemented using the test module 134. The test system 200 includes a test framework 202. The test framework 202 can provide a structure for conducting tests of logic portions that access objects in the object-processing framework 108. The test framework 202 can provide testing that uses standardized tests. For example, the test framework 202 can be implemented so that external influences do not falsify or otherwise unduly influence test results. The test framework 202 can be implemented in a computer system such as the server 102, or the test framework 202 can be implemented in another system, such as a system dedicated to testing. In some implementations, creating the test system 200 involves creating a "snapshot" of one or more aspects of an existing system, such as the object-processing framework 108 (FIG. 1). In the described example, the snapshot is taken of transactional data in the system.

The test framework 202 uses one or more of interfaces 120, 122, 124, and 126, respectively, to call logic in logic portions 112, 114, 116, and 118. The logic portions can be called so that they can be tested by the test framework 202.

The test framework 202 includes interfaces IF_MODIFY 204 and IF_READ 206 which correspond to the interfaces 128 and 130 included in the object-processing framework 108. That is, in some implementations, the interface to the test framework 202 "seen" by any of the logic portion can be the same as would be the interface to the object-processing framework 108 in the system 100 (FIG. 1). As such, it may not be distinguishable, from the perspective of the logic portion, that it is accessing the test framework 202 and not the object-processing framework 108. In response to being called from the test framework 202, any or all of the logic portions 112, 114, 116, and 118 can call either or both of the interfaces 204 and 206 according to its internal configuration.

The interfaces 204 and 206 can access an object container 208 which is included in the test framework 202. The object container 208 can include simulations of objects which the logic portions 112, 114, 116, and 118 are attempting to access. The objects in the object container 208 can be simulations of objects from the object-processing framework 108. As such, the object container 208 can provide a simulated environment which can be controlled and which in important respects correlates to that of the object-processing framework 108.

The test framework 202 can be configured to simulate an environment for the logic portions 112, 114, 116 and 118 as if they had been called by the object-processing framework 108. The logic portions 112, 114, 116 and 118 can be called by the test framework 202 using the same interfaces 120, 122, 124 and 126 that are used by the object-processing framework 108. The logic portions 112, 114, 116 and 118 in turn can access objects through interfaces 204 and 206 which correspond to, or are identical to, interfaces 128 and 130.

The logic portions 112, 114, 116, and 118 can be called with one or more parameters. For example, an action logic portion that sets or changes the quantity of an item on a sales order can accept parameters which indicate the order to change, the item to change, and the new quantity amount. Users can supply one or more values for parameters and these parameters can be stored in a test parameter container 210, which is included in the test framework 202. For example, the test parameter container 210 here includes a set of parameters 212. Test parameters can be entered in a graphical user interface. One or more test parameters can be provided to the logic portions 112, 114, 116, and 118 when the logic portions 112, 114, 116, and 118 are called and the test parameter(s) can be used by the logic portion in performing its operation. As such, the parameter(s) provided to the logic portion can be considered input information for the logic that is sought to be tested. Particularly, the user in some implementations can select which input value(s) to use based on the specifics of the testing that is to be done.

As another example, the user can enter one or more return parameters. A return parameter can be a result value that the user expects the one or more tested operations to produce. For example, when the logic to be tested includes a mathematical operation, the return parameter can include one or more numerical values expected to result from the operation. As another example, when the logic to be tested is configured to identify one or more objects as satisfying a criterion (e.g., a criterion defined by the test parameter), the return parameter can include the corresponding object key(s). After the actual results of performing the test are obtained, the return parameter(s) can be compared to the actual test results and this comparison can be used as an indicator of the test. Return parameters can be stored in the test parameter container 210. For example, the test parameter container 210 here contains a set of return parameters 214.

As another example, return parameters can include a description or other definition of modifications that are expected to be made to one or more objects in the object container 208. The called logic portions may create, update or delete data in one or more objects in the object container 208 according to the functionality each logic portion is programmed to have. Such a modifying access to the buffered data can be gained using the interface IF_MODIFY.

The expected modification(s) can be entered using the test parameter container 210, for example under guidance of a graphical user interface. The expected modification(s) can be compared to actual modifications that are made during the testing of the logic portions 112-118.

In the above example, then, the user can enter the test parameters 212 and the return parameters 214. Being knowledgeable about the system 100 (where the portions 112-118 are to be used, and the object data of which may have been replicated in the container 208), the user can select the return parameters as being the correct result values of applying the particular logic portion using the submitted test parameters. The user can then cause the test framework 202 to call at least one of the logic portions 112-118 with the parameters, which logic in turn accesses the container 208 according to its instructions. Thereafter, a result of the processing done by the logic can be registered and compared with the return parameters 214. Finally, the outcome of this comparison, such as a binary pass/fail indication, can be presented to the user.

Figure 3:
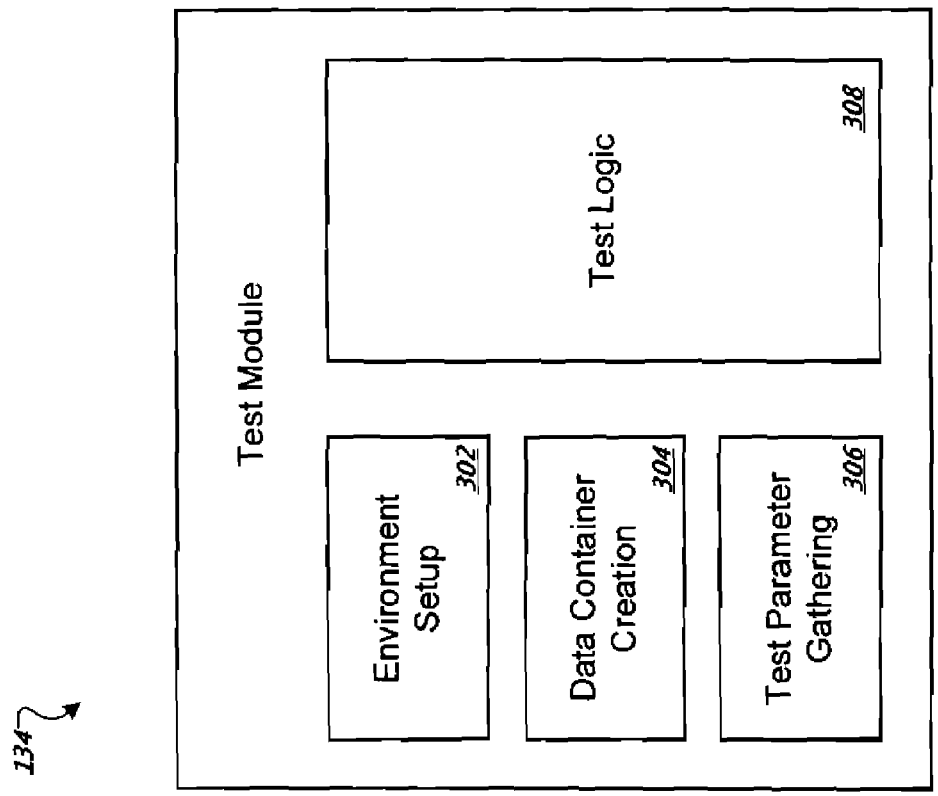
FIG. 3 is a block diagram of a test module.

FIG. 3 is a block diagram of an example of the test module 134. The test module 134 here has components for performing one or more specific test configuration and/or execution tasks. An environment setup component 302 can initialize and launch the test framework 202. For example, when this component is initiated it can take the necessary "snapshot" of the system 100, or of the object-processing framework 108, and implement the test framework 202 to be a faithful simulation of such a system/framework. A data container creation component 304 can set up one or more object instances in the object container 208. For example, the data container creation component 304 can copy object instances from a buffer, such as the buffer 132, and use them in creating the object container 208. The object instances that are placed into the object container 208 can be replicas or simulated versions of objects from the object-processing framework 108.

The above example of creating objects by taking a snapshot is not the only way that the object container 208 can be created. As another example, one or more objects can be created by the user through the use of a user interface. The user can supply data that will be used to create one or more objects having state conditions that the user deems will allow the testing of logic portions to work correctly. A combination approach can be used. For example, a snapshot can be taken to initially create objects in the object container 208, and the user can, through a user interface, adjust the data of one or more objects in the object container 208 to prepare for testing. Such adjustment(s) can be made to tailor the data to the specific logic that is to be tested.

The test module 134 includes a test parameter gathering component 306. The test parameter gathering component 306 can gather test parameters and return parameters from the user. The test parameter gathering component can launch a graphical user interface (GUI), and the user can use the GUI to enter test parameters.

The test module 134 includes a test logic component 308. The test logic component 308 can evaluate tests and output the outcome of completed tests. Test results can be compared to user-entered return parameters. If a user-entered return parameter matches a corresponding test result, then a message can be displayed to the user indicating that a test was successful, If a user-entered return parameter does not match a corresponding test result, then a message can be displayed to the user indicating that a test failed. In some implementations, the test logic component 308 includes logic that can automatically compare test results to return parameters without user intervention, which can have the advantage that the user need to enter only the test parameter and the expected return value, and not program any aspect of the testing logic.

Figure 4:
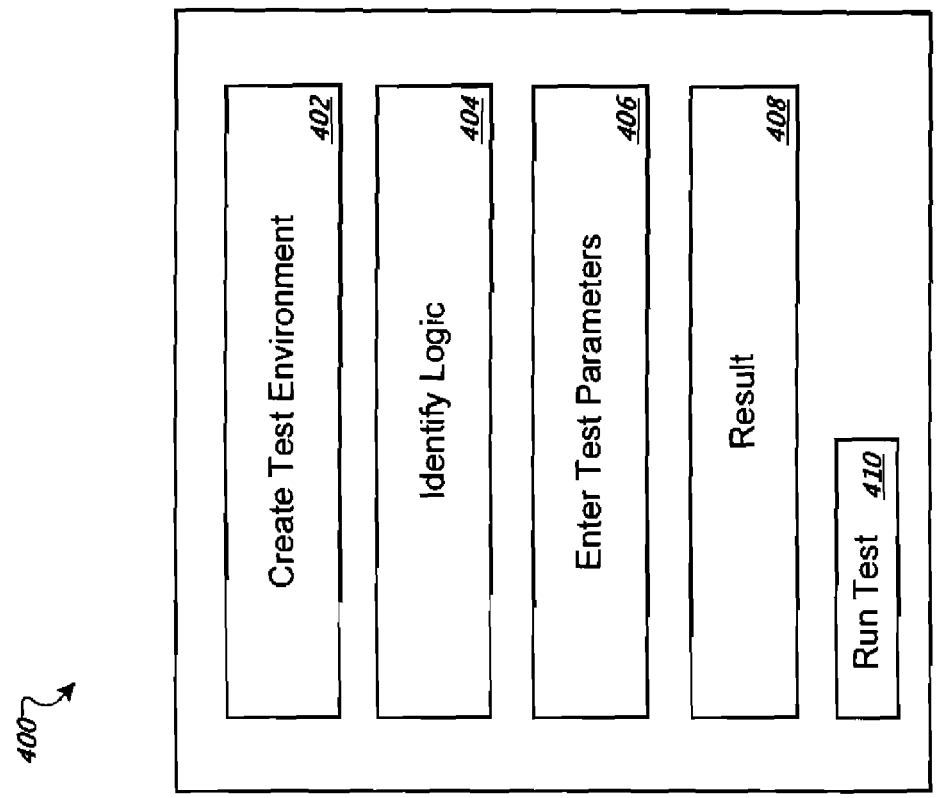
FIG. 4 is a graphical user interface for test configuration and execution.

FIG. 4 is a graphical user interface (GUI) 400 which can be used for test configuration and execution. A create test environment area 402 can provide that the user can create and initialize the test environment. For example, the environment setup 302 and data container creation 304 components of the test module 134 can be executed in response to user input in the area 402.

The user can use an identify logic area 404 to select which logic portion to test. The identify logic area 404 can include a selection control, such as a list box, with which the user can select a logic portion, such as any or all of the logic portions 112, 114, 116, or 118. As another example, the identify logic area 404 can include a text area in which the user can type the name of a logic portion.

The user can enter one or more test parameters or return values in an enter test parameters area 406. The enter test parameters area 406 can include an input control for entering parameters to be used in calling the logic portion that is to be tested, or return values for evaluating a test result. For example, a text entry control, or set of text entry controls can be used.

The GUI 400 can include a result area 408. The result area 408 can be used for outputting an outcome of the testing. For example, the result area 408 can display a message indicating the outcome of the test logic component 308, such as a "test passed" message if a return parameter matches a test result, or a "test failed" message if a return parameter does not match a test result.

The GUI 400 can include a run test button 410. The user can push the run test button 410 to execute a test and this can activate the test module 134 (FIGS. 1, 3) to call the appropriate logic with the entered test parameter. After the test has completed, the test results can be shown in the result area 408.

Figure 5:
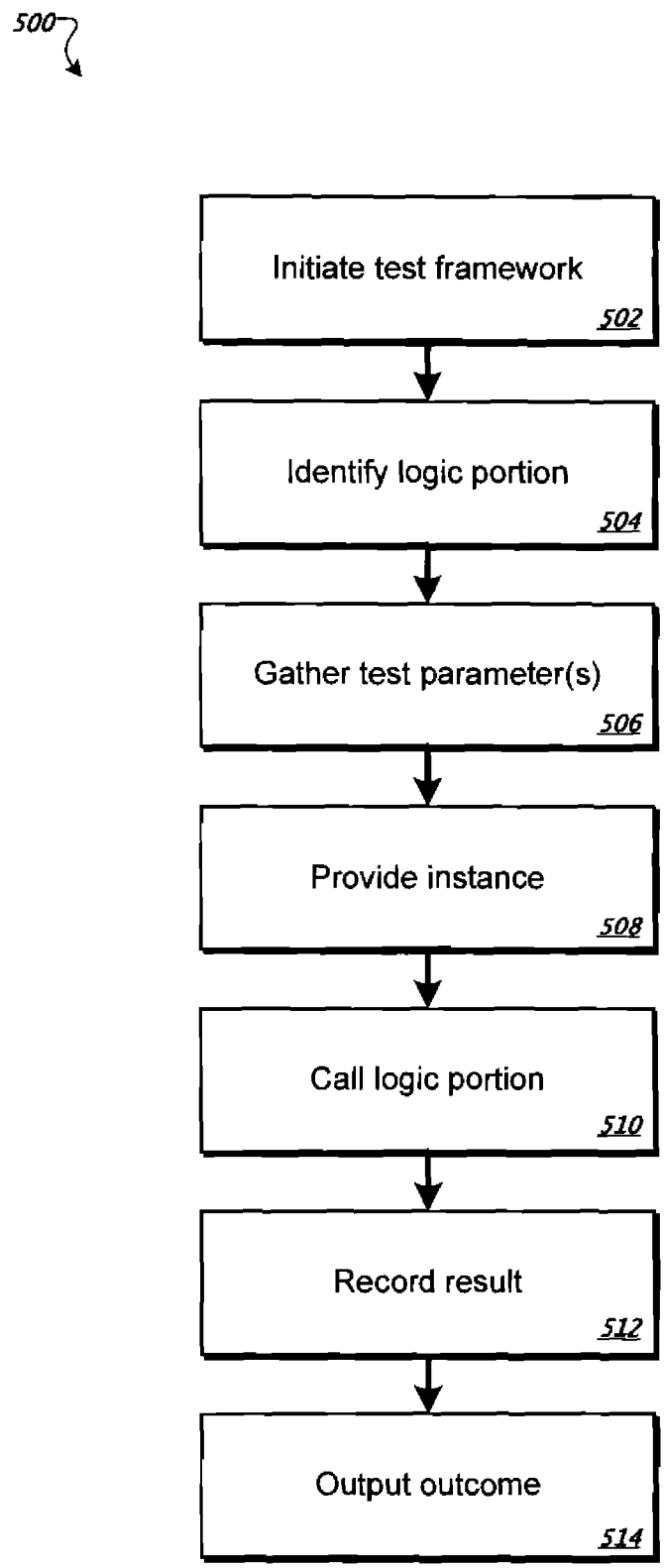
FIG. 5 is a flowchart for a method that can be performed for test configuration and execution.

FIG. 5 is a flowchart for a method 500 that can be performed for test configuration and execution. The method 500 can be performed by a processor executing instructions in a computer program product. As an example, the method 500 can be performed by the test module 134. The method 500 begins in step 502 with an initialization of a test framework. For example, the test framework 202 can be initiated. Initialization can include setup and initialization of the object container 208 and the test parameter container 210.

In step 504, a logic portion is identified. For example, any of the portions 112-118 can be identified. The logic portion to test can be identified by a user through a GUI, such as the GUI 400. As another example, the logic portion to test can be identified programmatically, such as in a regression test where all logic portions are tested in a batch.

In step 506, test parameters are gathered. For example, any or all of the parameters in the set of parameters 212 can be gathered. Multiple input parameters and return parameter information can be gathered. Test parameters can be entered by a user through a GUI, such as the GUI 400. Test parameters can also be retrieved from a repository, such as a file or database. A repository can include multiple combinations of input parameters for a particular test. The step 506 can involve selecting a particular combination of parameters. Test parameters can be generated programmatically, such as by generating parameter values within a range of values.

In step 508, an instance of at least one object that is associated with an object-processing framework is provided. The test framework has at least one interface that is common with the object-processing framework. For example, the object container 208 can be provided in relation to the object-processing framework 108 and the test framework 202 can have the IF_MODIFY interface 204 and/or the IF_READ interface 206. The logic portion to be tested may, as part of its processing, request access to an object in the object container 208. The data container creation component 304 can create and initialize instances of objects in the object container 208. A simulated object in the object container 208 can be modified using custom coding before being accessed by the called logic portion.

In step 510, the logic portion to be tested is called with at least one test parameter received from a user. For example, logic portions 112, 114, 116, or 118 may be called. The logic portion to be tested is supplied with one or more input parameters gathered in step 506. The logic portion is called, and during its execution, it may request access to an object in the object container 208 through an interface.

The logic portion to be tested may, as part of its logic, call other logic portions. The test framework 202 can simulate a call to the other logic portions during testing and prevent the other logic portions from being called. By allowing only one logic portion to be called, a controlled environment can be created. If a test fails, the called logic portion can be identified as containing faulty code. For example, in an uncontrolled environment where multiple logic portions are called, it would not be known which logic portion contained faulty code in the case of a failed test.

In step 512, the result of executing the called logic portion is recorded. For example, return values received from interfaces 120-126 can be recorded. As another example, modifications made during execution of the called logic portion to objects in the object container 208 can be recorded.

In step 514, the outcome of the testing is outputted. For example, the return parameter information gathered in step 506 can be compared to the result recorded in step 512 and if the return parameter matches the recorded result, a message indicating a successful test can be displayed, such as in the result area 408 of GUI 400. As another example, modifications made to objects in the object container 208 can be compared to expected modifications, and if the actual modifications match the expected modifications, a message indicating a successful test can be displayed.

In the case of a failed test, the testing outcome can be displayed as a detailed comparison which shows the differences between expected and actual modifications made to objects in the object container 208. In an implementation involving a structured type, there can be identified any field name(s) containing a differing or unexpected value. The outcome of testing can be logged to a file, stored in a database, printed onto a report, etc.

Figure 6:
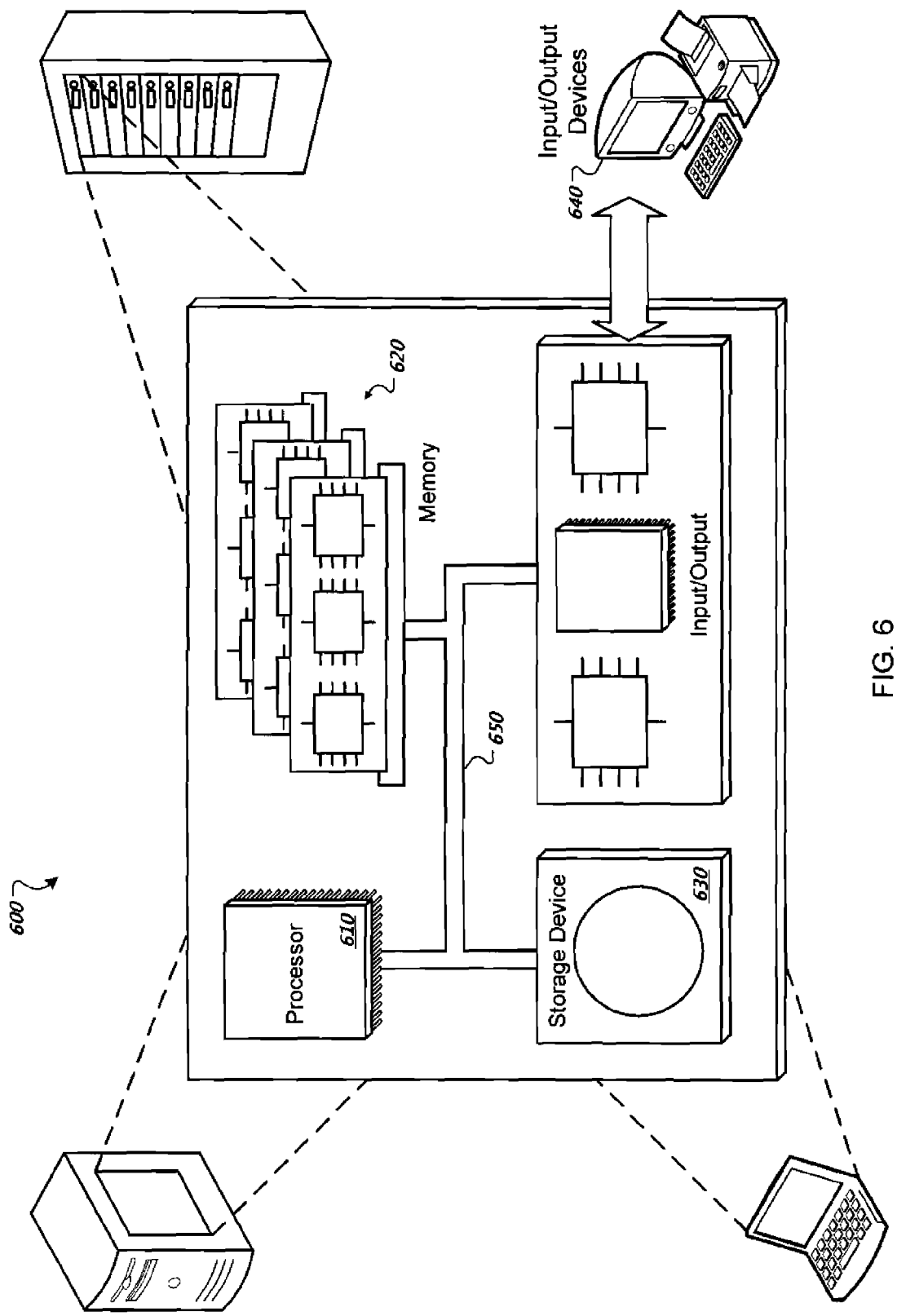
FIG. 6 is a block diagram of a computing system that can be used in connection with computer-implemented methods described in this document.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for performing testing on executable logic, the method comprising:
   providing an object-processing framework that includes objects used by application programs and that includes instructions for calling a first logic portion to access the objects;
   providing a test framework that has a first interface to the first logic portion that is common with the object-processing framework;
   copying at least some of the objects included in the object-processing framework to the test framework so that the test framework includes instances of the objects;
   receiving at least one test parameter from a user;
   testing the first logic portion using the test framework by calling the first logic portion with the at least one test parameter so that the first logic portion accesses at least one of the instances of the objects included in the test framework, wherein the first logic portion is configured to call a second logic portion in response to being called;
   preventing the second logic portion from being called during the testing, wherein the test framework has a second interface to the second logic portion that is common with the object-processing framework;
   simulating a call to the second logic portion during the testing; and
   recording a result of an operation that is performed as the first logic portion accesses the at least one of the instances of the objects included in the test framework using the first interface.

2. The computer-implemented method of claim 1, wherein providing the test framework is performed before calling the first logic portion 3. The computer-implemented method of claim 1, wherein the test framework is configured to simulate an environment for the first logic portion as if the first logic portion had been called by the object-processing framework.

4. The computer-implemented method of claim 1, wherein the test framework has at least a READ interface and a MODIFY interface that are common with the object-processing framework, and wherein the access of the at least one of the instances of the objects is made using at least one of the READ interface and the MODIFY interface.

5. The computer-implemented method of claim 1, further comprising:
   obtaining the at least one test parameter and at least one return parameter from the user before calling the first logic portion, the at least one return parameter being an expected outcome of the testing; and
   outputting an outcome of the testing to the user, the outcome determined by comparing the result of the operation with the at least one return parameter.

6. The computer-implemented method of claim 5, wherein the at least one test parameter and the at least one return parameter are obtained under guidance of a user interface, and wherein the user interface provides for initiation of the testing without the user specifying how to determine the outcome.

7. The computer-implemented method of claim 1, further comprising modifying, using custom coding, at least one of the instances of the objects and the at least one test parameter before calling the first logic portion.

8. A non-transitory computer-readable device comprising instructions that, when executed by a processor, cause the processor to perform a method for performing testing on executable logic, the method comprising:
   providing an object-processing framework that includes objects used by application programs and that includes instructions for calling a first logic portion to access the objects;
   providing a test framework that has a first interface to the first logic portion that is common with the object-processing framework;
   copying at least some of the objects included in the object-processing framework to the test framework so that the test framework includes instances of the objects;
   receiving at least one test parameter from a user;
   testing the first logic portion using the test framework by calling the first logic portion with the at least one test parameter so that the first logic portion accesses at least one of the instances of the objects included in the test framework, wherein the first logic portion is configured to call a second logic portion in response to being called;
   preventing the second logic portion from being called during the testing, wherein the test framework has a second interface to the second logic portion that is common with the object-processing framework;
   simulating a call to the second logic portion during the testing; and
   recording a result of an operation that is performed as the first logic portion accesses the at least one of the instances of the objects included in the test framework using the first interface.

9. The computer-readable device of claim 8, wherein providing the test framework is performed before calling the first logic portion.

10. The computer-readable device of claim 8, wherein the method further comprises:
    obtaining the at least one test parameter and at least one return parameter from the user before calling the first logic portion, the at least one return parameter being an expected outcome of the testing; and
    outputting an outcome of the testing to the user, the outcome determined by comparing the result of the operation with the at least one return parameter.

11. The computer-readable device of claim 8, wherein the method further comprises modifying, using custom coding, at least one of the instances of the objects and the at least one test parameter before calling the logic portion.

12. A non-transitory computer-readable device, the computer-readable device including instructions that, when executed by a processor, cause the processor to:
provide an object-processing framework that includes objects used by application programs and that includes instructions for calling a first logic portion to access the objects;
provide a test framework that has a first interface to the first logic portion that is common with the object-processing framework;
copy at least some of the objects included in the object-processing framework to the test framework so that the test framework includes instances of the objects; and
generate on a display device a graphical user interface for initiating testing on the first logic portion, the graphical user interface comprising:
 a first input control for entering at least one test parameter to be used in calling the first logic portion that is to be tested;
 a second input control for entering a return parameter that is an expected outcome of the testing; and
 a third input control for initiating the testing on the first logic portion by at least (i) calling the first logic portion with the at least one test parameter so that the first logic portion accesses at least one of the instances of the objects included in the test framework, wherein the first logic portion is configured to call a second logic portion in response to being called, (ii) preventing the second logic portion from being called during the testing, wherein the test framework has a second interface to the second logic portion that is common with the object-processing framework, (iii) simulating a call to the second logic portion during the testing, and (iv) recording a result of an operation that is performed as the first logic portion accesses the at least one of the instances of the objects included in the test framework.

13. The computer-readable device of claim 12, wherein the graphical user interface further comprises an output area for outputting an outcome of the testing determined by comparing (i) the return parameter with (ii) the result of the operation.

14. The computer-readable device of claim 13, wherein the at least one test parameter and the return parameter are obtained under guidance of the graphical user interface, and wherein the user interface provides for initiation of the testing without the user specifying how to determine the outcome.

15. The computer-readable device of claim 12, wherein the graphical user interface further provides for modifying, using custom coding, at least one of the at least one test parameter and the at least one of the instances of the objects before calling the first logic portion.

\* \* \* \* \*